United States Patent
Idnani

(10) Patent No.: US 7,487,199 B2
(45) Date of Patent: Feb. 3, 2009

(54) METHOD AND APPARATUS FOR MAINTAINING SIP CONTACT ADDRESSES

(75) Inventor: Ajaykumar R. Idnani, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 591 days.

(21) Appl. No.: 10/625,389

(22) Filed: Jul. 23, 2003

(65) Prior Publication Data

US 2004/0143671 A1 Jul. 22, 2004

Related U.S. Application Data

(60) Provisional application No. 60/413,106, filed on Sep. 24, 2002.

(51) Int. Cl.
*G06F 15/16* (2006.01)
*H04Q 7/20* (2006.01)
*H04Q 7/24* (2006.01)
*H04J 3/24* (2006.01)

(52) U.S. Cl. .............. 709/200; 709/230; 709/231; 709/202; 709/245; 455/456; 455/435; 370/338; 370/349

(58) Field of Classification Search ............... 455/456, 455/435; 709/200, 230, 231, 202, 245; 370/338, 370/349
See application file for complete search history.

(56) References Cited

U.S. PATENT DOCUMENTS

| | | | |
|---|---|---|---|
| 5,649,286 A * | 7/1997 | Frerking | 455/435.1 |
| 5,918,176 A * | 6/1999 | Arrington et al. | 455/430 |
| 6,763,233 B2 * | 7/2004 | Bharatia | 455/433 |
| 6,857,021 B1 * | 2/2005 | Schuster et al. | 709/227 |
| 6,978,135 B2 * | 12/2005 | Sasada | 455/435.1 |
| 2002/0004821 A1 * | 1/2002 | Togawa et al. | 709/206 |
| 2002/0026527 A1 * | 2/2002 | Das et al. | 709/245 |
| 2002/0037723 A1 * | 3/2002 | Roach | 455/435 |
| 2002/0042277 A1 * | 4/2002 | Smith | 455/456 |
| 2002/0114317 A1 | 8/2002 | Dorenbosch et al. | |
| 2002/0120760 A1 * | 8/2002 | Kimchi et al. | 709/230 |
| 2002/0131395 A1 * | 9/2002 | Wang | 370/349 |
| 2002/0141358 A1 | 10/2002 | Requena | |
| 2002/0169883 A1 | 11/2002 | Bright et al. | |
| 2002/0169887 A1 * | 11/2002 | MeLampy et al. | 709/231 |
| 2003/0012151 A1 | 1/2003 | Vassilovski | |
| 2003/0018704 A1 * | 1/2003 | Polychronidis et al. | 709/202 |
| 2003/0026289 A1 | 2/2003 | Mukherjee et al. | |
| 2003/0086411 A1 | 5/2003 | Vassilovski | |
| 2003/0129991 A1 * | 7/2003 | Allison et al. | 455/456 |
| 2003/0220990 A1 * | 11/2003 | Narayanan et al. | 709/220 |
| 2004/0203763 A1 * | 10/2004 | Tammi | 455/435.1 |
| 2005/0213545 A1 * | 9/2005 | Choyi et al. | 370/338 |

OTHER PUBLICATIONS

U.S. Appl. No. 60/361,596.*

* cited by examiner

*Primary Examiner*—Philip C Lee

(57) ABSTRACT

The present application describes various embodiments that address the need in wireless environments and within the SIP framework to efficiently maintain SIP contact addresses. It introduces the concept of a SIP proxy user agent (UA) (e.g., 123 or 124) to serve as a gateway between a SIP core network and a SIP-unaware mobile (101). A new parameter, called "created," is described for the contact header in SIP 200 OK messages, which is used to trigger deregistrations by SIP proxy UAs that no longer serve a particular mobile. It is this process for deregistering SIP proxy UAs that allows SIP contact addresses to be more efficiently maintained.

14 Claims, 1 Drawing Sheet

METHOD AND APPARATUS FOR MAINTAINING SIP CONTACT ADDRESSES

REFERENCE(S) TO RELATED APPLICATION(S)

The present application claims priority from provisional application Ser. No. 60/413,106, entitled "METHOD AND APPARATUS FOR MAINTAINING SIP CONTACT ADDRESSES," filed Sept. 24, 2002, which is commonly owned and incorporated herein by reference in its entirety.

CROSS-REFERENCE TO RELATED APPLICATION

This application is related to a co-pending application, Ser. No. 10/625,385, entitled "METHOD AND APPARATUS FOR MAINTAINING SIP CONTACT ADDRESSES USING EVENT SUBSCRIPTION," filed on even date herewith, assigned to the assignee of the instant application, and hereby incorporated by reference.

FIELD OF THE INVENTION

The present invention relates generally to wireless communications and, in particular, to maintaining SIP contact addresses within radio access networks.

BACKGROUND OF THE INVENTION

Next generation wireless communication systems are being designed to provide a variety of internet-based services. To support such services, protocols such as the Session Initiation Protocol (SIP) are being adopted and incorporated into these systems. SIP is a text-based protocol, similar to HTTP and SMTP, for initiating interactive communication sessions between users. Such sessions include voice, video, chat, interactive games, and virtual reality. The Internet Engineering Task Force (IETF) may be contacted for a complete description of the SIP standard.

To incorporate SIP into wireless systems, however, limitations such as the air interface and user mobility must be addressed. For example, SIP uses contact addresses to tie a user's address-of-record to his/her location. The contact addresses are centrally registered with a SIP Registrar using SIP REGISTER messages. However, SIP currently lacks the robustness to efficiently maintain contact addresses for mobile units as they move across service areas, at least in certain wireless implementations of SIP. Therefore, a need exists within the SIP framework for an apparatus and method to effectively and efficiently maintain SIP contact addresses in wireless environments.

DETAILED DESCRIPTION OF EMBODIMENTS

The present application describes various embodiments that address the need in wireless environments and within the SIP framework to efficiently maintain SIP contact addresses. It introduces the concept of a SIP proxy user agent (UA) to serve as a gateway between a SIP core network and a SIP-unaware mobile. A new parameter, called "created," is described for the contact header in SIP 200 OK messages, which is used to trigger deregistrations by SIP proxy UAs that no longer serve a particular mobile. It is this process for deregistering SIP proxy UAs that allows SIP contact addresses to be more efficiently maintained.

Figure 1:
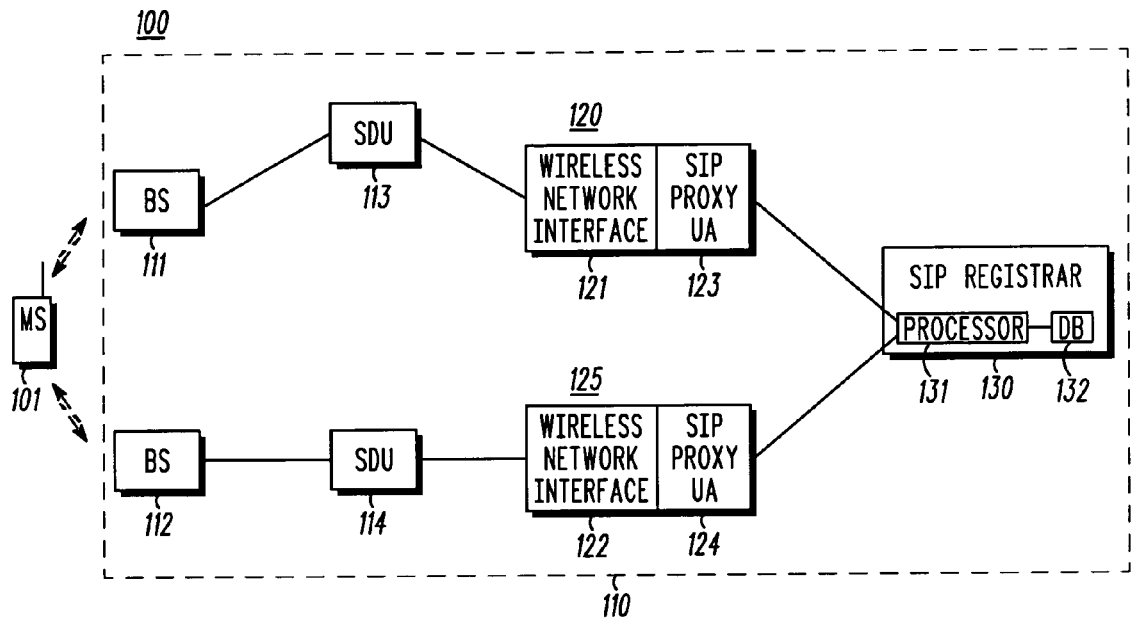
FIG. 1 is a block diagram depiction of a wireless communication system in accordance with an embodiment of the present invention.
Figure 2:
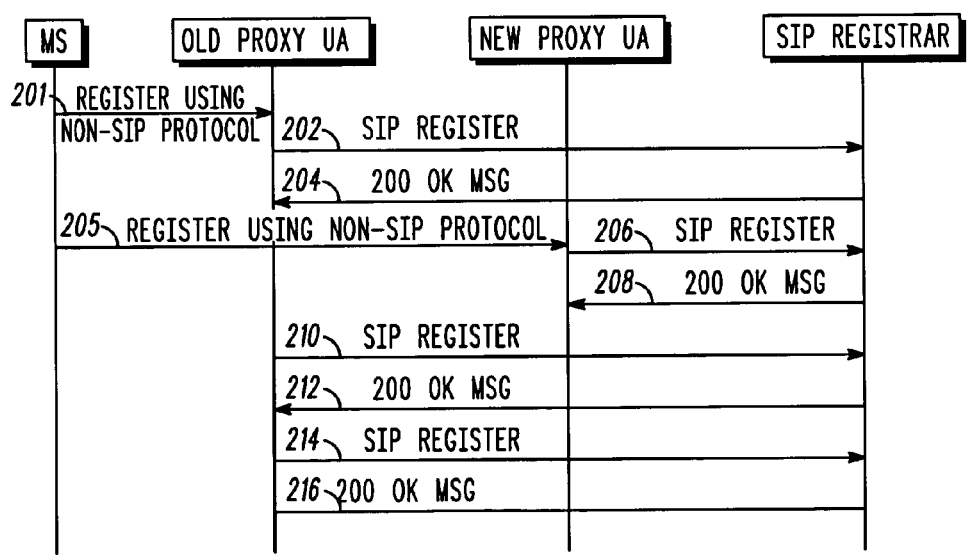
FIG. 2 is a call flow depiction of messaging between system elements in accordance with an embodiment of the present invention.

The disclosed embodiments can be more fully understood with reference to FIGS. 1 and 2. FIG. 1 is a block diagram depiction of a wireless communication system 100 in accordance with a first embodiment of the present invention. Communication system 100 is a well-known Code Division Multiple Access (CDMA) system, specifically a CDMA 2000 system, which is based on the Telecommunications Industry Association/Electronic Industries Association (TIA/EIA) standard IS-2000, suitably modified to implement the present invention. However, the present invention is not limited to a particular wireless technology. Therefore, in alternate embodiments, communication system 100 may utilize other communication system protocols such as, but not limited to, "iDEN," UMTS, 1× EVDV, 1× EVDO, GPRS, EDGE, and WLANs.

The first embodiment of the present invention includes a radio access network (RAN) 110 and remote units, such as mobile station (MS) 101. However, the present invention is not limited to remote units that are mobile. For example, a remote unit may comprise a desktop computer wirelessly connected to the radio access network.

Those skilled in the art will recognize that FIG. 1 does not depict all of the network equipment necessary for system 100 to operate but only those logical entities particularly relevant to the description of embodiments of the present invention. For example, system 100 comprises well-known entities such as base sites 111 and 112, frame selection and distribution units (SDUs) 113 and 114, SIP components 120 and 125 (each comprising a wireless network interface (121 and 122) and a SIP proxy UA (123 and 124)), and SIP registrar 130. Those skilled in the art are aware of the many ways each of these entities can be implemented and/or purchased from wireless communications companies such as "MOTOROLA."

SIP components 120 and 125 and SIP registrar 130 comprise well-known data communication entities such as wireless network interfaces 121 and 122, processor 131, and SIP location database 132. SIP components 120 and 125 also comprise data communication entities such as SIP proxy UAs 123 and 124, which are based on well-known SIP UAs. However, SIP proxy UAs serve as a SIP gateway for SIP-unaware units that are not themselves SIP UAs. All of these data communication entities typically comprise components such as microprocessors, memory, and/or logic circuitry designed to implement particular algorithms and/or protocols. Given such an algorithm, protocol definition (e.g., IETF's SIP specification), or logic flow, those skilled in the art are aware of the many design and development techniques available to implement SIP components and SIP registrars to perform the given logic.

Although not explicitly shown, system 100 further comprises base transceiver stations (BTSs), which interface with devices such as base site controllers (BSCs), mobile switching centers/virtual location registers (MSC/VLRs), home location registers (HLRs), etc. In the first embodiment of the present invention, a known CDMA 2000 RAN is adapted using known telecommunications design and development techniques to implement the logic of the present invention. The result is RAN 110, which performs the method described with respect to FIG. 2. Those skilled in the art will recognize that the present invention may be implemented in and across various physical components of RAN 110, not just on the physical processing platforms of SIP components 120 and 125 and SIP registrar 130 as illustrated in FIG. 1.

Operation of the first embodiment, in accordance with the present invention, occurs substantially as follows. As shown in FIG. 1, MS 101 may obtain wireless services from RAN 110 via either base site 111 or 112. However, as RAN 110 is architected, a different SIP component serves the two wireless service areas of base sites 111 and 112. When MS 101 begins obtaining service from BS 111 it sends a registration request message to SIP component 120. This registration request message is not a SIP message, but rather a registration message in accordance with the wireless protocol utilized by MS 101 (e.g., CDMA 2000).

FIG. 2 is a call flow depiction of the messaging between system elements in accordance with the first embodiment of the present invention. MS 101's registration request message 201 is shown in call flow diagram 200. Message 201 is received by SIP proxy UA 123 via wireless network interface 121. Acting as a proxy user agent for MS 101, SIP proxy UA 123 then sends a registration message for MS 101 to SIP registrar 130. Thus, proxy UAs act as gateways between the SIP core network and the SIP-unaware mobile. Proxy UAs are responsible for running the UA call engine for each of the mobiles that they serve, and additionally, for translating the call control messaging between SIP and the appropriate wireless protocol.

In conjunction with the proxy UAs, SIP registrars maintain a list of contact addresses for each of the mobiles that they serve. Generally, when a SIP registrar receives a SIP REGISTER message for a remote unit, it obtains the contact address from the message and adds it to the list of contact addresses for that unit. For example, in the first embodiment of the present invention, SIP proxy UA 123 sends SIP REGISTER message 202 for MS 101 to SIP registrar 130. SIP REGISTER message 202 comprises the following information (including a contact address):

REGISTER sip:registrar.home.com
    Via: SIP/2.0/UDP proxyUA1.visited.com:5060
    From:UserA <userA@home.com>
    To: UserA <userA@home.com>
    Call-ID: 123456@proxyUA1.visited.com
    Cseq: 1 REGISTER
    Contact: userA@proxyUA1.visited.com
    Expires: 7200
    Content-Length: 0

SIP REGISTER message 202 indicates that it comprises a new contact address by the CSeq field having the value "1 REGISTER". Thus, processor 131 of SIP registrar 130 stores the contact address provided, "userA@proxyUA1.visited.com", as an additional contact address for MS 101 in SIP location database 132. Along with the contact address, however, processor 131 also stores a creation timestamp to indicate when this particular contact address was added to the contact list for MS 101.

In response to SIP REGISTER message 202, SIP registrar 130 sends SIP 200 OK message 204 to SIP proxy UA 123. SIP 200 OK message 204 includes all the current contact addresses for MS 101 and their associated "created" timestamps. SIP 200 OK message 204 comprises the following information:

SIP/2.0 200 OK
    Via: SIP/2.0/UDP registrar.home.com:5060
    From: UserA <userA@home.com>
    To: UserA <userA@home.com>
    Call-ID: 123456@proxyUA1.visited.com
    Cseq: 1 REGISTER
    Contact: userA@proxyUA1.visited.com;
        created=2002-03-18:12:24:31
    Content-Length:0

When MS 101 begins obtaining service from BS 112 it sends a non-SIP registration request message to SIP component 125. This registration request message 205 is received by SIP proxy UA 124 via wireless network interface 122. Acting as a proxy user agent for MS 101, SIP proxy UA 124 then translates the registration request into SIP REGISTER message 206 and sends it to SIP registrar 130 for MS 101. SIP REGISTER message 206 comprises the following information (including the new contact address):

REGISTER sip:registrar.home.com
    Via: SIP/2.0/UDP proxyUA2.visited.com:5060
    From:UserA <userA@home.com>
    To: UserA <userA@home.com>
    Call-ID: 123456@proxyUA2.visited.com
    Cseq: 1 REGISTER
    Contact: userA@proxyUA2.visited.com
    Expires: 7200
    Content-Length: 0

Note that UA1 of message 202 refers to the "old" proxy UA of FIG. 2, while UA2 of message 206 refers to the "new" proxy UA of FIG. 2.

SIP registrar 130 receives message 206, and processor 131 stores the contact address provided, "userA@proxyUA2.visited.com", as an additional contact address for MS 101 in SIP location database 132. Along with the contact address, however, processor 131 also stores a creation timestamp to indicate when this particular contact address was added to the contact list for MS 101.

In response to SIP REGISTER message 206, SIP registrar 130 sends SIP 200 OK message 208 to SIP proxy UA 124. SIP 200 OK message 208 includes all the contact addresses for MS 101 and their associated "created" timestamps. Therefore, SIP 200 OK message 208 comprises the following information:

SIP/2.0 200 OK
    Via: SIP/2.0/UDP registrar.home.com:5060
    From: UserA <userA@home.com>
    To: UserA <userA@home.com>
    Call-ID: 123456@proxyUA2.visited.com
    Cseq: 1 REGISTER
    Contact: userA@proxyUA1.visited.com;
        created=2002-03-18:12:24:31
    Contact: userA@proxyUA2.visited.com;
        created=2002-03-18:18:19:35
    Content-Length:0

In the first embodiment of the present invention, a registration timer in SIP proxy UA 123 eventually expires triggering an attempt to renew MS 101's registration with registrar 130. Thus, SIP proxy UA 123 sends SIP REGISTER message 210 for MS 101 to SIP registrar 130. SIP REGISTER message 210 comprises the following information:

REGISTER sip:registrar.home.com
    Via: SIP/2.0/UDP proxyUA1.visited.com:5060

From:UserA <userA@home.com>
To: UserA <userA@home.com>
Call-ID: 63158@proxyUA1.visited.com
Cseq: 16 REGISTER
Contact: userA@proxyUA1.visited.com
Expires: 7200
Content-Length: 0

In response to receiving SIP REGISTER message 210, SIP registrar 130 sends SIP 200 OK message 212 to SIP proxy UA 123. SIP 200 OK message 212 includes all the current contact addresses for MS 101 and their associated "created" timestamps. Therefore, SIP 200 OK message 212 comprises the following information:

```
SIP/2.0 200 OK
Via: SIP/2.0/UDP registrar.home.com:5060
From: UserA <userA@home.com>
To: UserA <userA@home.com>
Call-ID: 63158@proxyUA1.visited.com
Cseq: 16 REGISTER
Contact:  userA@proxyUA1.visited.com;
          created=2002-03-18:12:24:31
Contact:  userA@proxyUA2.visited.com;
          created=2002-03-18:18:19:35
Content-Length:0
```

SIP 200 OK message 212 indicates a contact address more recent than any provided by SIP proxy UA 123, i.e., the contact address with the "created" timestamp of "2002-03-18:18:19:35". SIP proxy UA 123 recognizes that there is a more recent contact address for MS 101, and sends a deregistration message for MS 101 to SIP registrar 130. In the first embodiment of the present invention, this deregistration message comprises a SIP REGISTER message with an "expires" header value set to "0". Thus, SIP REGISTER message 214 comprises the following information:

REGISTER sip:registrar.home.com
Via: SIP/2.0/UDP proxyUA1.visited.com:5060
From:UserA <userA@home.com>
To: UserA <userA@home.com>
Call-ID: 63158@proxyUA1.visited.com
Cseq: 17 REGISTER
Contact: userA@proxyUA1.visited.com
Expires: 0
Content-Length: 0

Upon receiving SIP REGISTER message 214, SIP location processor 131, removes the "userA@proxyUA1.visited.com" contact address for MS 101 from location database 132. SIP registrar 130 also responds to SIP REGISTER message 214 with SIP 200 OK message 216, which includes an updated list of the current contact addresses for MS 101, as follows:

```
SIP/2.0 200 OK
Via: SIP/2.0/UDP registrar.home.com:5060
From: UserA <userA@home.com>
To: UserA <userA@home.com>
Call-ID: 63158@proxyUA1.visited.com
Cseq: 17 REGISTER
Contact:  userA@proxyUA2.visited.com;
          created=2002-03-18:18:19:35
Content-Length:0
```

Call flow 200 thus is completed.

In summary, SIP uses contact addresses to tie a unit's address-of-record to its location. The contact addresses are centrally registered with a SIP registrar using SIP REGISTER messages. The SIP 200 OK responses from the SIP registrar list all of the current contact addresses for the unit. In call flow 200 above, when the unit moves to a new service area, the new proxy UA in that area registers the contact address with the SIP registrar. After some time when the old proxy UA sends a SIP REGISTER to renew the registration, it gets a 200 OK response back from the SIP registrar containing both the old and the new contact addresses. The old proxy, examines the contact addresses and their timestamps, realizes that there is a new proxy UA for the user, and then deregisters its contact address.

It is this process for deregistering SIP proxy UAs that allows SIP contact addresses to be more efficiently maintained. Before, when a unit moved from one service area to another, its registration at the old service area would often be kept active by the proxy UA in that area. This was because the old proxy UA did not know that the unit had moved and that a new proxy UA was serving it. As a result, system resources were wasted since messaging such as SIP INVITEs are forked to the entire contact list. Thus, removing old contact addresses as described herein can reduce unnecessary network traffic.

In the foregoing specification, the present invention has been described with reference to specific embodiments. However, one of ordinary skill in the art will appreciate that various modifications and changes may be made without departing from the spirit and scope of the present invention as set forth in the appended claims. Accordingly, the specification and drawings are to be regarded in an illustrative rather than a restrictive sense, and all such modifications are intended to be included within the scope of the present invention. In addition, those of ordinary skill in the art will appreciate that the elements in the drawings are illustrated for simplicity and clarity. For example, the dimensions of some of the elements in the drawings may be exaggerated relative to other elements to help improve an understanding of the various embodiments of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically or electrically. The term "program" (or "programming"), as used herein, is defined as a sequence of instructions designed for execution on a computer system. A program, programming, or computer program, may include a subroutine, a function, a procedure, an object method, an object implementation, an executable application, an applet, a servlet, a source code, an object code, a shared library/dynamic load library and/or other sequence of instructions designed for execution on a computer system.

What is claimed is:

1. A method for maintaining SIP contact addresses, the method comprising:
   receiving a first registration message for a remote unit from a first SIP proxy user agent (UA);
   storing, as an additional member of a group of contact addresses for the remote unit, both a first contact address based on the first registration message and a first creation timestamp for the first contact address;
   receiving a second registration message for the remote unit from a second SIP proxy UA after receiving the first registration message;
   storing, as an additional member of the group of contact addresses for the remote unit, both a second contact address for the remote unit and a second creation timestamp for the second contact address;
   receiving a third registration message for the remote unit from the first SIP proxy UA;
   sending, in response to the third registration message, a response that indicates a contact address more recent than any contact addresses provided by the first SIP proxy UA;
   receiving a deregistration message for the remote unit from the first SIP proxy UA; and
   removing, from the group of contact addresses for the remote unit, the first contact address.

2. The method of claim 1 wherein the response that indicates the contact address more recent than any contact addresses provided by the first SIP proxy UA comprises a SIP 200 OK message and at least one creation time stamp.

3. The method of claim 2 wherein the response further comprises the group of contact addresses and a creation time stamp for each.

4. The method of claim 1 wherein the first registration message comprises a SIP REGISTER message, the second registration message comprises a SIP REGISTER message, and the third registration message comprises a SIP REGISTER message.

5. The method of claim 1 wherein the deregistration message comprises a SIP REGISTER message with an Expires header value of "0".

6. A SIP registrar comprising:
   a SIP location data base; and
   a SIP location processor, communicatively coupled to the SIP registration data base, adapted to
   receive a first registration message for a remote unit from a first SIP proxy user agent (UA),
   store in the SIP location data base, as an additional member of a group of contact addresses for the remote unit, both a first contact address based on the first registration message and a first creation timestamp for the first contact address,
   receive a second registration message for the remote unit from a second SIP proxy UA after receiving the first registration message,
   store in the SIP location data base, as a member of the group of contact addresses for the remote unit, both a second contact address for the remote unit and a second creation timestamp for the second contact address,
   receive a third registration message for the remote unit from the first SIP proxy UA,
   send, in response to the third registration message, a response that indicates a contact address more recent than any contact addresses provided by the first SIP proxy UA,
   receive a deregistration message for the remote unit from the first SIP proxy UA, and
   remove, from the group of contact addresses for the remote unit, the first contact address.

7. The SIP registrar of claim 6 wherein the response that indicates the contact address more recent than any contact addresses provided by the first SIP proxy UA comprises a SIP 200 OK message and at least one creation time stamp.

8. The SIP registrar of claim 7 wherein the response further comprises the group of contact addresses and a creation time stamp for each.

9. The SIP registrar of claim 6 wherein the first registration message comprises a SIP REGISTER message, the second registration message comprises a SIP REGISTER message, and the third registration message comprises a SIP REGISTER message.

10. The SIP registrar of claim 6 wherein the deregistration message comprises a SIP REGISTER message with an Expires header value of "0".

11. The SIP registrar of claim 6 wherein the third registration message is received subsequent to a registration timer expiration.

12. The SIP registrar of claim 6 wherein the first registration message comprises a SIP REGISTER message that indicates that the SIP REGISTER message comprises a new contact address.

13. The method of claim 1 wherein the third registration message is received subsequent to a registration timer expiration.

14. The method of claim 1 wherein the first registration message comprises a SIP REGISTER message that indicates that the SIP REGISTER message comprises a new contact address.

* * * * *